Patented May 14, 1946

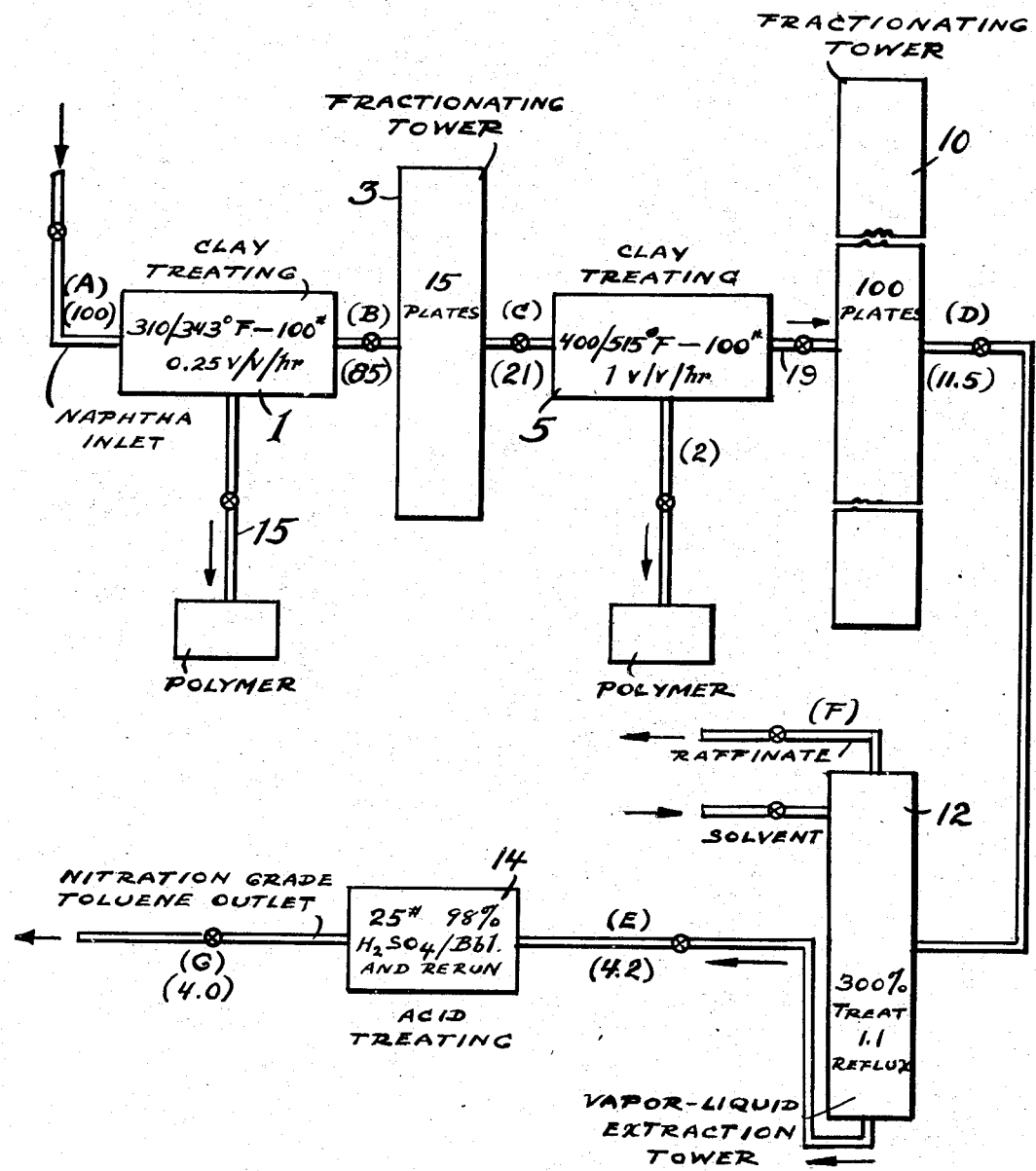

2,400,355

UNITED STATES PATENT OFFICE 2,400,355

PRODUCTION OF AROMATICS

Minor C. K. Jones, Mountainside, and Frederick W. Schumacher, Westfield, N. J., assignors to Standard Oil Development Company, a corporation of Delaware Application October 14, 1942, Serial No. 461,912

4 Claims. (Cl. 260—674)

The present invention relates to improvements in the art of producing aromatic hydrocarbons from petroleum oil sources and, more particularly, it relates to improvements in the art of solvent treating petroleum fractions containing aromatics under such conditions as to avoid loss of phenolic solvents which are customarily employed as selective solvents in the recovery of the aromatics.

Recently, a great deal of research has been directed toward the production of aromatics, particularly toluene from petroleum oil sources. There are several methods of producing toluene, as follows: In the first place, toluene occurs naturally in relatively small amounts in virgin oil. In the second place, toluene is produced in the catalytic cracking, for example, of gas oil. Thirdly, toluene may be produced by steam cracking a gas oil. Again, there is also another important process for producing toluene which involves the dehydrogenation of C7 hydrocarbons such as methylcyclohexane in the presence of a catalyst. This latter operation generally is referred to as catalytic reforming. In the steam cracking of gas oil, the operation is usually performed under such conditions that there are produced substantial quantities of olefins, and the same is true with respect to catalytic cracking.

In the usual process of recovering toluene from the oil, a relatively narrow boiling cut, say boiling from 195° F.–250° F., is segregated and, according to best procedure, this fraction is vaporized and treated with liquefied anhydrous phenol in a solvent extraction zone, whereupon the toluene which is concentrated in the vapor fraction is dissolved in the phenol and thereafter recovered therefrom by fractional distillation. Except in the case where the toluene is extracted from virgin oil, there are present appreciable quantities of olefinic hydrocarbons, and the phenol during the extraction undergoes alkylation to form alkylated phenols and consequently causes solvent losses. In particular, the diolefinic hydrocarbons which are present polymerize to form high boiling non-phenolic material in the solvent which leads to operating difficulties as well as to excessive solvent losses.

It is the main object of our invention to condition hydrocarbons containing aromatics to be solvent treated in order to improve the latter operation and render it operable technically and economically.

A more specific object of our present invention is to make possible the recovery of toluene from hydrocarbons containing this aromatic in the presence of olefinic hydrocarbons, in order to minimize the amount of solvent lost in the process and to avoid the formation of high-boiling non-phenolic material in the solvent.

Other and further objects of our invention will appear from the following more detailed description and claims.

Stated briefly at first, our invention resides in the concept of clay treating a hydrocarbon mixture containing aromatics, as well as mono-olefins and diolefins after fractionation into a narrow boiling fraction, in order to remove the said olefins and thereafter treating the hydrocarbons in vapor phase with liquefied phenol, the purpose of the clay treatment being to remove the olefinic hydrocarbons which tend to polymerize and also to react with the phenol or other solvent thus converting it into nonusable reaction products.

In the accompanying drawing, we have shown by means of a flow plan a preferred modification of operating our invention.

Referring in detail to the drawing, a naphtha fraction produced by cracking gas oil in the presence of 75 mol. % of steam (in which operation the cracking furnace was at an inlet pressure of 63.5 lbs. gauge and an outlet pressure of 17.5 lbs. gauge and at an inlet temperature of 710° F. and an outlet temperature ranging from 1173° F. to 1196° F., total feed to the cracking furnace being 103% of the fresh feed) was subjected to a treatment with clay at 1 at a temperature within the range of from above 300° F.–343° F. while maintaining a pressure of about 100 lbs. per square inch gauge on the system and at a feed rate of about 0.25 volume of oil per volume of catalyst per hour, whereupon the olefins and particularly the conjugated diolefins were polymerized and withdrawn as heavy polymer as indicated in the drawing. The charging stock substantially free of its conjugated di-olefinic content was then fractionated at 3 and a narrow boiling fraction comprising about 21 volume percent of the original material (containing 21% toluene) and boiling within the range of from 175° F.–265°F. was withdrawn and again treated at 5 with clay at a temperature within the range of from about 400° F.–515° F. while maintaining a pressure of about 100 lbs. per square inch gauge on the system and feeding the fraction to the clay treatment at a rate of about 1 volume of oil per volume of catalyst per hour. It will be noted that in this second clay treatment the temperatures were somewhat higher as was the feed rate.

This second clay treatment resulted in the further formation of heavy polymer and this was withdrawn from the system as indicated, leaving a residue amounting to 19% by volume of the original naphtha, which was then subjected after suitable heating to further fractionation at 10. In carrying out the fractionation at 10, we employed a 100 plate fractionation column and from this fractionation we recovered a fraction boiling within the range from 200° F.–240° F. (containing 38% toluene) representing 11.5% of the original naphtha charged to the system and this fraction was then subjected at 12 to a vapor-liquid extraction treatment, that is to say, the hydrocarbons in vapor form were treated with liquid phenol at a temperature at the top of the column of about 220° F. and at the bottom of the column of about 330° F., the ratio of liquefied phenol by weight to the feed hydrocarbons being 3 to 1, and in which solvent treatment we employed a reflux ratio of 1 to 1; that is to say, we recycled to the solvent treating zone a weight of hydrocarbon overhead equal to the weight of the nonaromatic portion withdrawn from the treating zone. The details of vapor-liquid extract treatment are well-known and need not be discussed at length here. The application of Chester L. Read, Serial No. 394,983, filed May 24, 1941, gives a full description of this type of operation.

The solvent treatment resulted, of course, in the formation of two phases, namely a raffinate phase which was withdrawn as indicated from 12, and an extract phase (containing 96% toluene) representing 4.2 volume percent of the original naphtha, and this extract phase after liberation of the solvent therefrom was subjected to treatment with sulfuric acid of 98% strength, 25 lbs. of the said acid being employed for each barrel of oil, this operation taking place at 14 in the drawing. After washing, neutralizing and distilling in a finishing still according to known methods, nitration grade toluene, that is, toluene of 99+% purity, was obtained in an amount equal to 4% by volume of the original naphtha charged to the system. The effectiveness of the process is shown by the fact that this nitration grade toluene was 89% of the toluene originally present in the naphtha.

It has already been pointed out that when vapor-liquid extracting cracked naphthas, such as the steam cracked naphtha first discussed, for recovery of aromatics such as toluene, appreciable reaction took place between the naphtha and phenol used as solvent, even though the original naphtha had been clay treated for removal of olefinic type constituents. In addition, high boiling non-phenolic material was produced which accumulated in the solvent. Both of these factors led to operating difficulties as well as excessive solvent losses.

In the example now under discussion, the phenol remaining in the extraction system after approximately 20 volumes of naphtha per volume of phenol had been extracted was analyzed by distillation after removal of all naphtha. When the process was carried out as just described upon distillation of the phenol, the amount of residue after removal of pure phenol was 3%; the last 5% fraction from this distillation showed a phenol content of 96%. However, when all of the steps of the process were not carried out as described, in particular the second clay treat not being carried out, the amount of residue after removal of pure phenol was 30%, and the last 5% fraction from the analytical distillation contained 55% phenol. Thus, the process as set forth in this invention saved over 27% of the phenol used. In a similar trial of phenol extraction of virgin naphtha and analysis of the phenol, 2% of residue remained after removal of pure phenol, and the phenol content of the last 5% fraction of the analytical distillation was 98%. Thus, the present invention has made possible on cracked naphtha results approximately equivalent to those obtained with virgin naphthas, and has made possible recovery of toluene from cracked naphthas that are particularly rich in aromatics and other than for the presence of olefinic material, highly desirable sources of toluene.

While particularly applicable to conditioning feed stock for vapor-liquid extraction with phenol, the present process may be used to condition feed to any of the successful processes for extraction of aromatics, such as sulfur dioxide extraction, and extraction with alkylated phenols and other solvents.

It will be distinctly understood that in the foregoing specific example which we have given, setting forth the results of a run which we made, the specific details are merely illustrative and do not impose any limitation on our invention. Thus, for example, the clay treatment carried out at 1 may be successfully operated under the following range of conditions:

Temperature, 150° F.–400° F.
Pressure, atmospheric to 400#
Feed rate, 0.25–1.0 v./v./hr.

As to the second clay treatment, the following range of conditions give good results:

Temperature, 250° F.–600° F.
Pressure, 10#–400#
Feed rate, 0.25–1.0 v./v./hr.

To recapitulate, our present invention relates to improvements in the recovery of toluene and other aromatics from a hydrocarbon mixture containing, in addition to the desired aromatic such as toluene, appreciable quantities of olefins and particularly conjugated diolefins. If such a product is treated in vapor phase with liquefied phenol, we have found that some sort of reaction takes place between the phenol and the olefins, and while we do not wish to be bound by any theory, we believe that the phenols are alkylated and that the olefins are polymerized to form a high boiling polymer which, because of its high boiling point, is more readily separated from the phenol by distillation and serves to dilute the phenol thus introducing a multiplicity of operating difficulties and of course causing a loss of phenol. Or, the phenols may react by condensation with the olefins to form resins. To correct this difficulty in a solvent treating process, we have devised the present process of clay treating the hydrocarbon mixture containing the desired aromatic to polymerize and remove the olefins prior to the solvent treatment. For this clay treatment we may use any known polymerizing clay such as fuller's earth, activated bentonites, etc. which are available under such trade names as Attapulgus clay, Floridin, Milwhite and Superfiltrol. Also, instead of using two stages of clay treatment, we may employ a single stage or we may employ several stages of clay treatment.

Numerous modifications of our invention falling within the spirit thereof will readily suggest themselves to those who are familiar with this art.

What we claim is:

1. Process for manufacturing toluene, which comprises subjecting a naphtha fraction to treatment with clay at elevated temperature while imposing superatmospheric pressure thereon, whereby the olefins present are at least partly polymerized, separating the polymerized products, fractionating the remainder of the clay treated product to recover a fraction boiling substantially within the range of from 175° F. to about 265° F., subjecting the said fraction to a second clay treatment at higher temperature than employed in the first clay treatment whereby further quantities of olefins are polymerized, removing said polymerized product, subjecting the product remaining after the polymer removal to a second fractionation, recovering a product rich in toluene from the last named fractionation, subjecting said toluene-rich fraction to solvent treatment to form an extract containing toluene, separating the toluene from the solvent and recovering the said soluene.

2. The method set forth in claim 1 in which the temperature employed in the first clay treating step is from about 310° F. to about 343° F.

3. The method set forth in claim 1, in which the temperature employed in the second clay treating step is from about 400° F. to about 515° F.

4. In the process of purifying toluene containing fractions to recover toluene of nitratable grade, the improvement which comprises subjecting the crude toluene to a clay treatment at elevated temperature and pressure to polymerize at least a portion of the olefins present, separating the polymer, fractionating the product remaining after the polymer separation, subjecting a fraction containing toluene to a second clay treatment at a higher temperature than that employed in the first stage and also elevated pressure to polymerize olefins, separating the polymer, subjecting the product remaining after the second polymer removal to a second fractionation to recover a toluene fraction, thereafter recovering toluene by treating with a phenolic solvent to form an extract of toluene, separating the toluene from the solvent, acid treating the separated toluene and thereafter recovering toluene of nitratable grade.

MINOR C. K. JONES.
FREDERICK W. SCHUMACHER.